(12) United States Patent
Blinick et al.

(10) Patent No.: US 8,782,464 B2
(45) Date of Patent: *Jul. 15, 2014

(54) METHOD AND SYSTEM FOR USING A STANDBY SERVER TO IMPROVE REDUNDANCY IN A DUAL-NODE DATA STORAGE SYSTEM

(75) Inventors: Stephen L. Blinick, Tucson, AZ (US);
Scott A. Brewer, Tucson, AZ (US);
Yu-Cheng Hsu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 533 days.

This patent is subject to a terminal disclaimer.

(21) Appl. No.: 13/076,767

(22) Filed: Mar. 31, 2011

(65) Prior Publication Data
US 2012/0254654 A1 Oct. 4, 2012

(51) Int. Cl.
*G06F 11/00* (2006.01)

(52) U.S. Cl.
USPC .......................... 714/6.21; 714/4.11; 714/6.3

(58) Field of Classification Search
CPC ............ G06F 11/0727; G06F 11/2046; G06F 11/2071; G06F 11/2089; G06F 11/2097; G06F 2212/312; G06F 3/0689; G06F 11/1666; G06F 11/2092
See application file for complete search history.

(56) References Cited

U.S. PATENT DOCUMENTS

| | | | |
|---|---|---|---|
| 5,404,500 A * | 4/1995 | Legvold et al. | 714/6.1 |
| 6,006,342 A * | 12/1999 | Beardsley et al. | 714/5.11 |
| 6,496,942 B1 | 12/2002 | Schoenthal et al. | |
| 6,513,097 B1 * | 1/2003 | Beardsley et al. | 711/113 |
| 6,578,158 B1 * | 6/2003 | Deitz et al. | 714/11 |
| 6,598,174 B1 | 7/2003 | Parks et al. | |
| 6,609,213 B1 | 8/2003 | Nguyen et al. | |
| 7,243,190 B2 * | 7/2007 | Ash et al. | 711/113 |
| 7,308,600 B2 | 12/2007 | Dubal et al. | |
| 7,444,335 B1 | 10/2008 | Colrain et al. | |
| 7,529,967 B2 | 5/2009 | Findleton et al. | |
| 2005/0193240 A1 * | 9/2005 | Ash et al. | 714/7 |
| 2005/0240809 A1 * | 10/2005 | Ash et al. | 714/8 |
| 2006/0041780 A1 * | 2/2006 | Budaya et al. | 714/5 |
| 2006/0117212 A1 * | 6/2006 | Meyer et al. | 714/4 |
| 2007/0124348 A1 * | 5/2007 | Claborn et al. | 707/204 |

(Continued)

FOREIGN PATENT DOCUMENTS

CN 101183325 A 5/2008

OTHER PUBLICATIONS

Charles Blake et al., "High Availability, Scalable Storage, Dynamic Peer Networks: Pick Two," LCS at MIT, May 19, 2003 p2p-sci, 2003, 42 pages.

Cisco Systems, Inc., "Design Considerations for High Availability and Scalability in Blade Server Environments," White Paper, 2009, 9 pages.

(Continued)

*Primary Examiner* — Scott Baderman
*Assistant Examiner* — Jason Bryan
(74) *Attorney, Agent, or Firm* — Griffiths & Seaton PLLC

(57) ABSTRACT

A standby server, a first main server, and a second main server to control shared input/output (I/O) adapters in a storage system are provided. The standby server is in communication with the first main server and the second main server, and the storage system is configured to operate as a dual node active system. The standby server is activated in response to receiving a communication from the first main server of a fail mode of the second main server. Systems and physical computer storage media are also provided.

12 Claims, 3 Drawing Sheets

(56) References Cited

U.S. PATENT DOCUMENTS

| | | |
|---|---|---|
| 2008/0263391 A1* | 10/2008 | Blinick et al. .................... 714/5 |
| 2009/0217083 A1* | 8/2009 | Hatasaki et al. .................. 714/4 |
| 2010/0146328 A1* | 6/2010 | Yochai et al. ..................... 714/4 |
| 2010/0185895 A1* | 7/2010 | Clark et al. ....................... 714/5 |
| 2010/0202236 A1* | 8/2010 | Kahler et al. ................. 365/228 |

OTHER PUBLICATIONS

Y.B. Lee et al., "Storage Rebuild for Automatic Failure Recovery in Video-on-Demand Servers," IEEE, 0-7803-4371-9/97, 1997, pp. 258-261.

Jim Senicka, "Cost Effective High Availability with VERITAS Cluster Server," VERITAS White Paper, Aug. 2004, 8 pages.

* cited by examiner

METHOD AND SYSTEM FOR USING A STANDBY SERVER TO IMPROVE REDUNDANCY IN A DUAL-NODE DATA STORAGE SYSTEM

BACKGROUND OF THE INVENTION

1. Field of the Invention

The present invention relates in general to computers, and more particularly to system, and computer program product embodiments for improving reliability in a computer storage environment.

The present invention relates in general to computers, and more particularly to method, system, and computer program product embodiments for improving reliability in a computer storage environment.

2. Description of the Related Art

Storage area networks, or SANs, consist of multiple storage devices connected by one or more fabrics. Storage devices can be of two types: host systems that access data and storage subsystems that are providers of data. In a large distributed computer system, a plurality of host systems are typically connected to a number of direct access storage devices (DASDs) making up the storage subsystems. A storage controller controls read and write operations between host computers of the host systems and the DASDs. The DASDs are comprised of hard disk drives (HDDs) and may be organized in a redundant array of independent disks, i.e., a RAID array. A RAID array is comprised of multiple, independent disks organized into a large, high-performance logical disk. A controller stripes data across the multiple disks in the array and accesses the disks in parallel to achieve higher data transfer rates.

To reduce the risk of system failure due to failure of a hard disk drive in a DASD system such as a RAID array, redundancy in the form of error-correcting codes to tolerate disk failures is typically employed. Further, to reduce a risk of failure at a point within the storage controller, the storage controller is typically designed to handle hardware failure. For example, the storage controller can have two storage clusters, each of which provides for selective connection between a host computer and a DASD. Each cluster has a cache and a non volatile storage unit (NVS). The cache buffers frequently used data. When a request is made to write data to a DASD attached to the storage controller, the storage controller may cache the data and delay writing the data to a DASD. Caching data can save time as writing operations involve time consuming mechanical operations. The cache and NVS in each cluster can intercommunicate, allowing for recovery and reconfiguration of the storage controller in the event that one of the memory elements is rendered unavailable. For instance, if one cluster and its cache fail, the NVS in the other cluster maintains a back-up of the cache in the failed cluster.

Other storage controllers include multiple storage clusters or have an "n-way" architecture. In such configurations, if one cluster and its cache fail, the NVS in the other clusters maintains a back-up of the cache in the failed cluster.

SUMMARY OF THE INVENTION

From time to time, maintenance and/or upgrade functions are performed on the storage system. During these operations, dual-cluster storage controllers may failover to a single node configuration wherein the system runs on a single node configuration. As a result, the system becomes less fault tolerant than the normal dual node configuration. Though use of multiple storage clusters improves fault tolerance by allowing other clusters to continue to operate despite failover of one cluster, multiple storage cluster configurations are more complex than dual node configurations. Consequently, challenges associated with designing such configurations include costs, efficiency, and hardware/software. Accordingly, there is a need in the art for improved methods, systems, and programs for improving redundancy within the storage system when one server is in a fail mode.

Various embodiments of methods of storing data are provided that improve redundancy during a fail mode of a main server. In one embodiment, a method includes providing a standby server, a first main server, and a second main server to control a shared input/output (I/O) adapters in a storage system, where the standby server is in communication with the first main server and the second main server, and the storage system is configured to operate as a dual node system, and activating the standby server in response to receiving a communication from the first main server of a fail mode of the second main server Also provided are improved systems for storing data. One system comprises a first main server, a second main server in communication with the first main server, a standby server in communication with the first main server and the second main server, and shared input/output adapters in communication with the standby server, the first main server, and the second main server. The storage system is configured to operate as a dual node system, and the standby server is adapted to activate in response to receiving a communication from the first main server of a fail mode of the second main server.

Physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for controlling a storage system comprising a first main server, a second main server in communication with the first main server, and a standby server in communication with the first main server and the second main server, wherein the storage system is configured to operate as a dual node system with shared input/output adapters are also provided. One physical computer storage medium comprises computer code for activating the standby server in response to receiving a communication from the first main server of a fail mode of the second main server.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for storing data in a computer storage environment. Also provided are physical computer storage mediums for controlling a storage system comprising computer code activating a standby server in response to receiving a communication from a first main server of a fail mode of a second main server.

Figure 1:
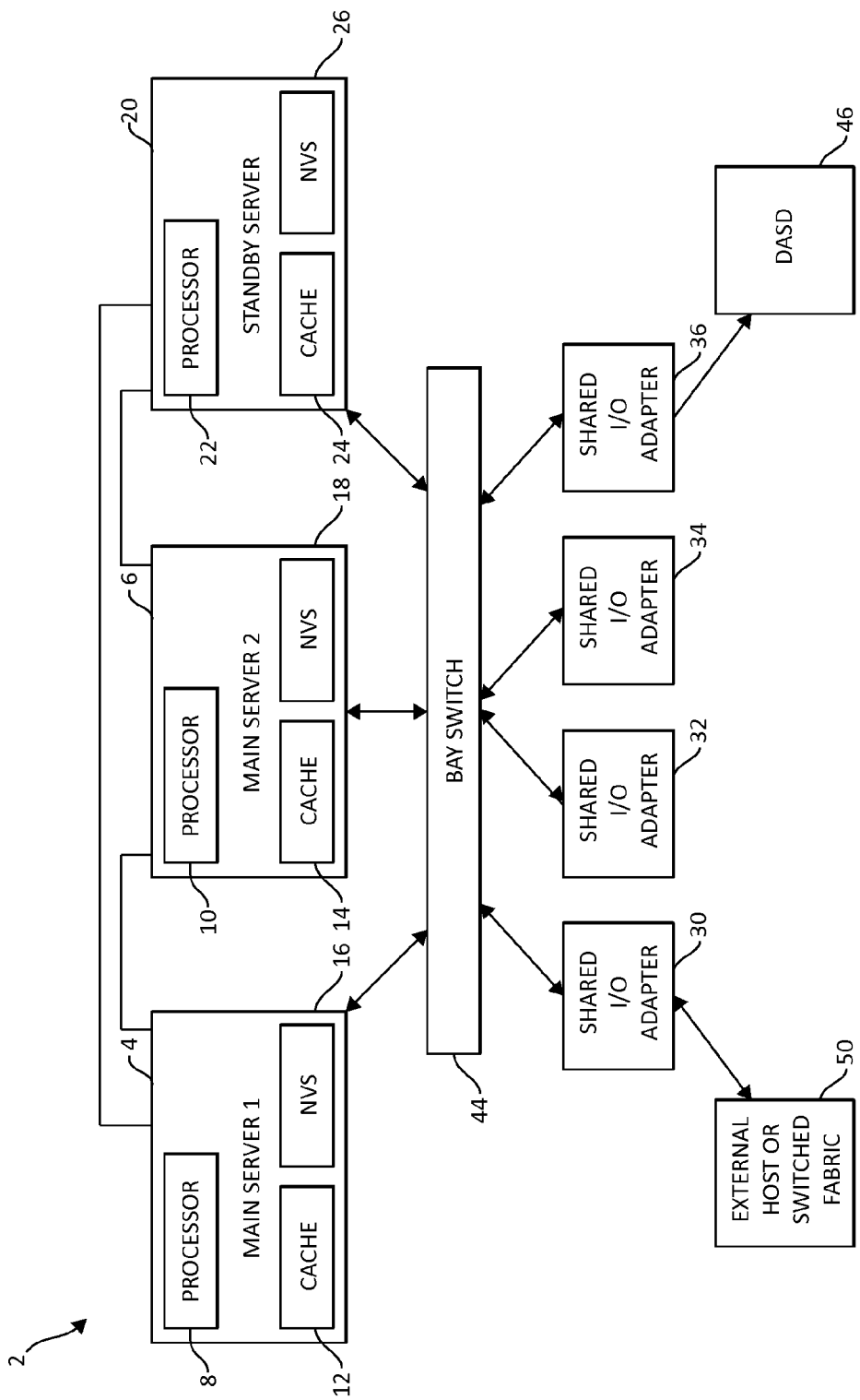
FIG. 1 is a block diagram of a dual node storage control system with which the present invention may be practiced.

FIG. 1 is a block diagram of the components and architecture of a preferred embodiment of a storage system 2. The storage system 2 is configured to operate a dual node system. As used herein, the term "dual node system" is defined as a system that continuously operates with two operational servers, such that multiple host and disk adapters coupled to the servers are continuously provided with two paths for data flow. In this regard, the storage control system includes a first main server 4 and a second main server 6 that communicate with each other to thereby send and receive communications between each other. The first and second main servers 4, 6 each comprise a processor 8, 14 cache 10, 16 and non-volatile storage 12, 18. Each component of the servers 4, 6 (e.g., processor 8, 14, cache 10, 16, and non-volatile storage 12, 18) are configured in a substantially similar manner. It will be appreciated that main server 4 and main server 6 are referred to as "first" and "second", respectively, for simplicity and ease of understanding. Thus, main server 4 can be referred to as the second main server and main server 6 can be referred to as the first main server, in other embodiments.

To provide redundancy and reduce system performance impact during a period of time in which one of the main servers 4, 6 is not operational, a standby server 20 is also provided. The standby server 20 is in communication with the first main server 4. Alternatively, the standby server 20 can additionally communicate with the second main server 6. Generally, the standby server 20 comprises processor 22, cache 24, and non-volatile storage 26 that generally are configured in a substantially similar manner to those included as part of the first and second main servers 6. In particular, the standby server 20 is configured to control the system 2 in an event in which one of the first or second main servers 4, 6 become non-operational. Additionally, the standby server 8 is further configured to assume an identity of the non-operational main server 4, 6 so that the system allows continuous operation of shared input/output (I/O) adapters 30, 32, 34, 36. Moreover, the standby server 8 is adapted to relinquish control of the system 2, when the non-operational main server 4, 6 is repaired.

The main servers 4, 6 and standby server 20 communicate over connections 40 that enable processor inter-communication to manage configuring operations performed with respect to the shared devices, such as the shared I/O adaptors 30, 32, 34, 36. In alternative embodiments, there may be only one fabric connecting all adaptors 30, 32, 34, 36. Alternatively, more than one fabric may be employed for communication.

In addition to communicating with each other, the servers 4, 6, 20 communicate with input/output devices such as shared I/O adapters 30, 32, 34, 36, DASD 46, and an external host or switched fabric 50. As illustrated, at least one path exist between each servers 4, 6, 20 and each adapter 30, 32, 34, 36, and the shared I/O adapters 30, 32, 34, 36 actively communicate with two of the servers 4, 6, 20 (which depends on which servers are active) to write both cache and NVS copies of data. In an embodiment, four shared I/O adapters 30, 32, 34, 36 are included. In other embodiments, more or fewer shared I/O adapters are employed. DASD 46, which includes multiple RAID arrays, is a magnetic storage unit such as a hard disk drive, disks, tapes, terminals, LANs (Local Area Networks), printers or other input/output devices or input/output subsystems. Although a single DASD 46 is illustrated, more can be included. For example, one or more shared I/O adapters 30, 32, 34, 36 can be coupled to one or more DASDs. The external host or switched fabric 50 can be a single server or multiple servers or mainframes connected either directly to the storage system 2 or indirectly through network switches. They can have different data formats (e.g. fixed-block or CKD) and use different hardware mediums and software protocols for connection (like fibre-channel or iSCSI).

The main servers 4, 6 and standby server 8 and input/output devices are connected by a bay switch 44. The bay switch 44 includes shared I/O resources and can comprise a dual master bus, which may be controlled by one of the first or second main server 4, 6 or standby server 20. In other embodiments, the bay switch 44 may include technology to allow the bus to operate at its own clock speed and provide a buffer to buffer data transferred across the bay switch 44.

As noted above, the inclusion of the standby server 20 with the main servers 4, 6 provides the system 2 with redundancy so that in an event in which one of the main servers 4, 6 fails, the standby server 20 can step in to allow the system 2 to continue to operate as a dual node storage system. Various events may cause one of the main servers 4, 6 to become non-operational. For example, some events may be scheduled, such as during maintenance, upgrades or repairs. In such case, the system 2 may be provided with a protocol that coordinates hand-off of shared resources from one server to another server.

Figure 2:
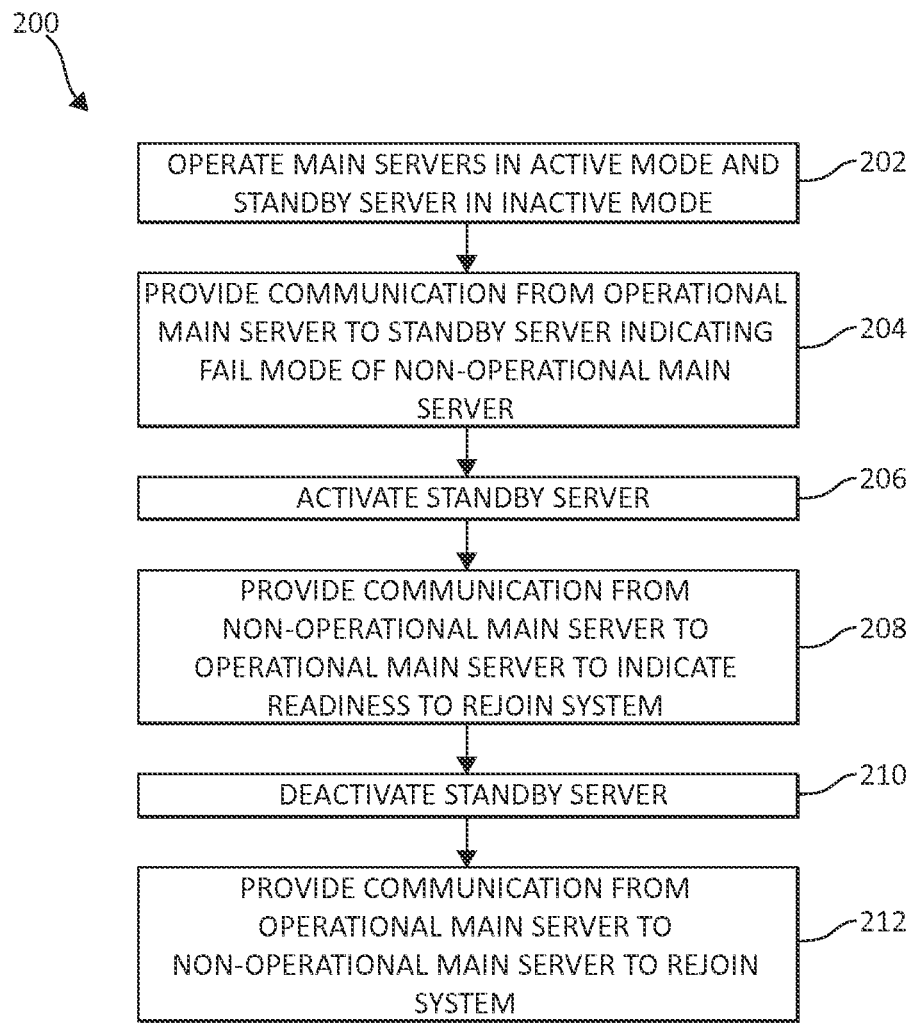
FIG. 2 is a flow chart diagram of an exemplary method for storing data in a computer storage environment.

FIG. 2 is a flow chart diagram of a method 200 for storing data in a computer storage environment, according to an embodiment. Before operation of one of the main servers is interrupted, the main servers (e.g., first and second main servers 4, 6) operate in an active mode, and the standby server (e.g., standby server 20) operates in an inactive mode, step 202. In particular, the first and second main servers operate in a dual node configuration to manage and perform input/output operations communicated from shared I/O adapters (e.g., shared I/O adapters 30, 32, 34 36). The input/output operations are temporarily stored in memory storage areas of the active main servers. For example, each main server contains a copy of its own data stored in its cache and a copy of modified cache data of the other main server in its NVS. Thus, for example, the first main server 4 would include a copy of its data in cache 12 and a copy of modified cache data of the second main server 6 in NVS 16, while the second main server 6 would include a copy of its data in cache 14 and a copy of modified cache data of the first main server 4 in NVS 18.

When one of the main servers, for example, the second main server 6, is taken down and becomes non-operational, this non-operational main server enters a "failback to service" condition. In the failback to service condition, a protocol is provided to the non-operational main server to voluntarily relinquish control of shared resources, and instructions are provided to the operational main server to direct the standby server to remain active. The non-operational main server may engage a failback to service condition during a code update or other MES scenario.

During the failback to service condition, the modified data stored on NVS of the operational main server is destaged through the bay switch 44 and the shared I/O adapters 30, 32, 34, 36 to other storage areas (e.g. a DASD) to the preserve the integrity of the data. In this way, the system 2 retains the modified data associated with the non-operational main server despite server shut down. Additionally, control of the resources previously shared between the two main servers is transferred to the operational server.

After failback to service on the non-operational main server is complete, the operational main server (e.g., first main server 4) provides a communication to the standby server indicating a fail mode of the non-operational main server (e.g., failback to service condition of the second main server 6), step 204. In response to receiving the communication, the standby server activates, step 206. The standby server enters a "failback to dual" condition to gain control of all of the operations performed by the non-operational main server and of the portion of the shared resources previously controlled by the non-operational main server to provide full redundancy for the system. Specifically, the standby server assumes the identity of the non-operational main server to provide continued operation without reset or reconfiguration of the shared input/output adapters of the storage system during the fail mode of the second main server. In particular, by employing shared I/O adapters, the hosts are not aware of any change between the main servers and the standby server in an event of the fail mode of the second main server, because paths between the hosts and the storage subsystem are not reconfigured or switched.

After the non-operational main server is updated and rebooted, the non-operational main server sends a signal to the operational main server that it is ready to rejoin the system, step 208.

Next, the standby server is deactivated in response to receiving a communication from the operational main server, step 210. In this regard, the operational main server enters a failback to service condition to regain control of the resources being handled by the standby server. In particular, the standby server relinquishes control of the resources and reboots, and control of the resources is transferred to the operational main server. After the failback to service is complete, the operational main server (e.g., the first main server 4) sends a request to the other main server (e.g., second main server 6) to rejoin the system and control of the shared resources are transferred from the operational main server to the other main server, step 212.

In some cases, upgrade, maintenance or scheduled repair is to be performed on the operational main server (referred to above as the first main server 4). In these instances, steps 202 through step 212 can be repeated. However, the first main server 4 performs the operations described in the method 200 associated with the non-operational main server and the second main server 6 performs the operations described in the method 200 associated with the operational main server.

Figure 3:
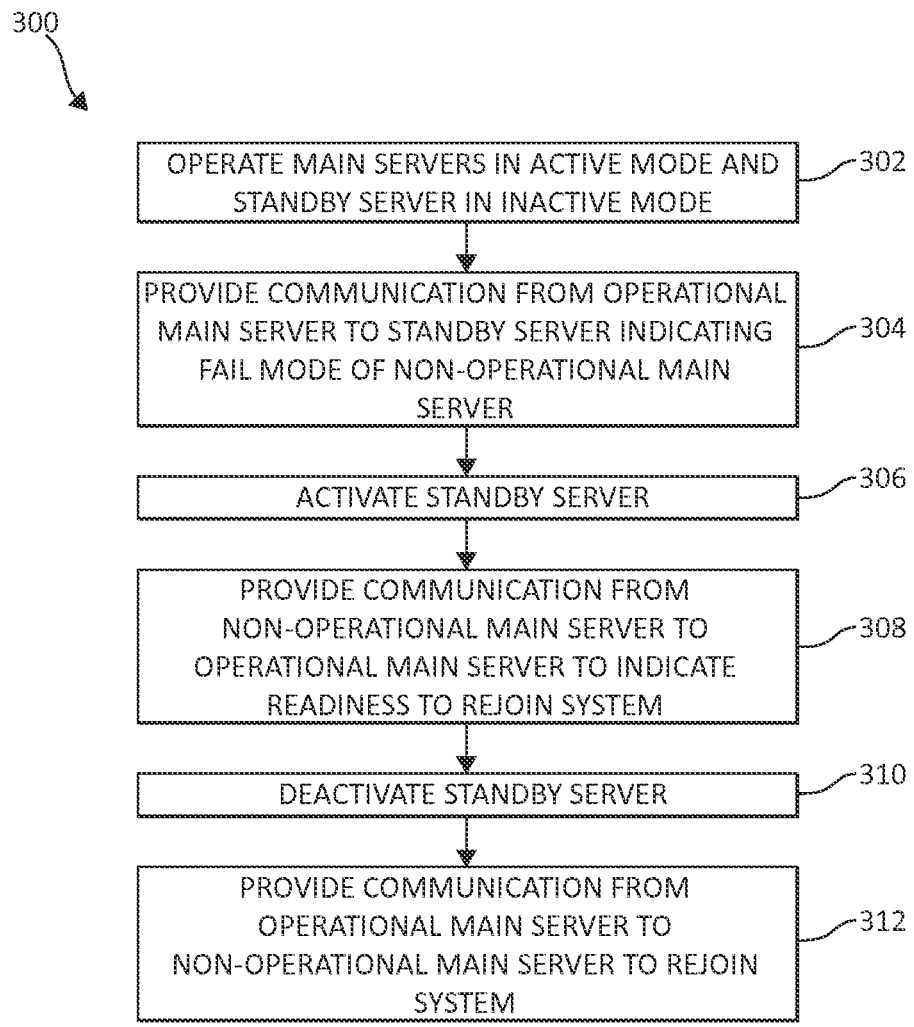
FIG. 3 is a flow chart diagram of another exemplary method for storing data in a computer storage environment.

In another case, operation of one of the main servers may be interrupted unexpectedly. FIG. 3 is a flow chart diagram of a method 200 for storing data in a computer storage environment, according to another embodiment. Before operation of one of the main servers is interrupted, both (e.g., first and second main servers 4, 6) operate in an active mode, and the standby server (e.g., standby server 20) operates in an inactive mode, step 302. In particular, the first and second main servers operate in a dual node configuration to manage and perform input/output operations communicated from the shared I/O adapters (e.g., shared I/O adapters 30, 32, 34 36). The input/output operations are temporarily stored in memory storages areas of the first and second main servers. For example, each main server contains a copy of its own data stored in its cache and a copy of modified cache data of the other main server in its NVS. Thus, for example, the first main server 4 would include a copy of its data in cache 12 and a copy of modified cache data of the second main server 6 in NVS 16, while the second main server 6 would include a copy of its data in cache 14 and a copy of modified cache data of the first main server 4 in NVS 18.

When one of the main servers, for example, the second main server 6, unexpectedly becomes non-operational, the system enters a "failover" condition during which an operational main server takes control of shared resources from the non-operational main server without permission from the non-operational main server. During the failover condition, the data stored on the NVS of the operational main server (e.g., the modified cache data) is destaged to the DASD, in an embodiment. In this way, the modified cache data is committed and the redundant data on the non-operational main server can be lost with minimal impact. Additionally, control of the resources previously shared between the two main servers is transferred to the operational server.

After failover to the operational main server is complete, the operational main server (e.g., first main server 4) provides a communication to the standby server indicating a fail mode of the non-operational main server (e.g., failover condition of the system 2), step 304. In response to receiving the communication, the standby server activates, step 306. The standby server gains control of all of the operations performed by the non-operational main server and of the portion of the shared resources previously controlled by the non-operational main server to provide full redundancy for the system. Specifically, the standby server assumes the identity of the non-operational main server to provide continued operation without reset or reconfiguration of the shared input/output adapters of the storage system during the fail mode of the second main server. After the non-operational main server is repaired, it sends a signal to the operational main server that it is ready to rejoin the storage system, step 308.

Next, the standby server is deactivated in response to receiving a communication from the operational main server, step 310. In this regard, the operational main server enters a failback to service condition to regain control of the resources being handled by the standby server. In particular, the standby server relinquishes control of the resources and reboots, and control of the resources is transferred to the operational main server. After the failback to service is complete, the operational main server (e.g., the first main server 4) sends a request to the other main server (e.g., second main server 6) to rejoin the storage system, step 312.

By including the standby server and by configuring the standby server to be capable of assuming the identity of a main server, the storage system continuously operates in the dual node configuration despite an event in which one of the main servers experiences a fail mode. As a result, the storage system has improved redundancy during code loads, MES upgrades, server level repair actions and/or failure scenarios. Moreover, system performance is maintained during such circumstances.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A system for storing data, the system comprising:
   a first main server including a cache and a non-volatile storage;
   a second main server in communication with the first main server, the second main server including a cache and a non-volatile storage;
   a standby server in communication with the first main server and the second main server; and
   shared input/output adapters in communication with the standby server, the first main server, and the second main server,
   wherein:
   the storage system is configured to operate as a dual node system,
   the cache of the first main server includes a copy of data corresponding to the first main server and the non-volatile storage of the first main server includes a copy of modified cache data of the second main server;
   the cache of the second main server includes a copy of data corresponding to the second main server and the non-volatile storage of the second main server includes a copy of modified cache data of the first main server;
   during a failback to service condition of the second main server, the modified cache data of the second main server stored on the non-volatile storage of the first main server is destaged through the shared input/output adapters and shared to other storage areas and the first main server sends communication to the standby server;
   the standby server is adapted to activate in response to receiving the communication from the first main server of a fail mode of the second main server and to provide continued operation by employing the shared I/O adapters; and
   the fail mode comprises a failover mode, and
   modified data is destaged from the first main server during the fail mode of the second main server, and the standby server is activated after destaging data.

2. The system of claim 1, further comprising an input/output bay switch coupled to the standby server, the first main server, and the second main server, wherein the shared input/output adapters are coupled to the input/output bay switch.

3. The system of claim 2, wherein the standby server is further configured to assume an identity of the second main server for continued operation of the shared input/output adapters of the storage system during the fail mode of the second main server.

4. The system of claim 3, wherein the standby server is further configured to assume the identity of the second main server without host disruption or reconfiguration during the fail mode of the second main server.

5. The system of claim 1, wherein the standby server is further configured to deactivate in response to receiving a communication from the first main server.

6. A non-transitory physical computer storage medium comprising a computer program product method for controlling a storage system comprising a first main server, a second main server in communication with the first main server, and a standby server in communication with the first main server and the second main server, wherein the storage system is configured to operate as a dual node system with shared input/output adapters, the physical computer storage medium comprising:
- computer code for storing a copy of data corresponding to the first main server in a cache of the first main server and for storing a copy of modified cache data of the second main server in a non-volatile storage of the first main server;
- computer code for storing a copy of data corresponding to the second main server in a cache of the second main server and for storing a copy of modified cache data of the first main server in a non-volatile storage of the second main server;
- computer code for, during a failback to service condition of the second main server, destaging the modified cache data of the second main server stored on the non-volatile storage of the first main server through the shared input/output adapters and sharing the modified cache data of the second main server to other storage areas and sending communication from the first main server to the standby server; and
- computer code for activating the standby server in response to receiving the communication from the first main server of a fail mode of the second main server and to provide continued operation by employing the shared I/O adapters, wherein:
the fail mode comprises a failover mode; and
the physical computer storage medium further comprises:
- computer code for destaging modified data from the first main server during the fail mode of the second main server, and
- computer code for performing the step of activating the standby server, after destaging data.

7. The physical computer storage medium of claim 6, further comprising computer code for commanding the standby server to assume an identity of the second main server for continued operation of input/output adapters of the storage system during the fail mode of the second main server.

8. The physical computer storage medium of claim 7, wherein the computer code for commanding the standby server includes computer code for operating the standby server without reconfiguration of the shared input/output adapters.

9. The physical computer storage medium of claim 6, further comprising computer code for deactivating the standby server in response to receiving a communication from the first main server.

10. The physical computer storage medium of claim 6, wherein:
the fail mode comprises a service mode, and
the physical computer storage medium further comprises computer code for updating and rebooting the second main server during the fail mode.

11. The physical computer storage medium of claim 10, further comprising computer code for deactivating the standby server in response to receiving a communication from the first main server.

12. The physical computer storage medium of claim 6, further comprising computer code for deactivating the standby server in response to receiving a communication from the second main server.

* * * * *